US012595757B2

(12) United States Patent
Jung et al.

(10) Patent No.: US 12,595,757 B2
(45) **Date of Patent: *Apr. 7, 2026**

(54) ENGINE CONTROL SYSTEM INCLUDING DUAL CONTINUOUS VARIABLE VALVE DURATION DEVICE AND GPF FORCED REGENERATION METHOD USING THE ENGINE CONTROL SYSTEM

(71) Applicants: Hyundai Motor Company, Seoul (KR); Kia Corporation, Seoul (KR)

(72) Inventors: Jinyoung Jung, Hwaseong-Si (KR); Sangyeon Han, Hwaseong-Si (KR); Young Nam Kim, Hwaseong-Si (KR); You Sang Son, Hwaseong-Si (KR); Back Sik Kim, Hwaseong-Si (KR); Sangjae Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/802,176

(22) Filed: Aug. 13, 2024

(65) Prior Publication Data

US 2025/0163837 A1 May 22, 2025

(30) Foreign Application Priority Data

Nov. 20, 2023 (KR) ........................ 10-2023-0160994

(51) Int. Cl.
*F01N 3/023* (2006.01)
*F01N 3/20* (2006.01)
(Continued)

(52) U.S. Cl.
CPC ............. *F01N 3/0235* (2013.01); *F01N 3/20* (2013.01); *F01N 9/002* (2013.01); *F02D 13/0215* (2013.01)

(58) Field of Classification Search
CPC .......... F01N 3/0235; F01N 3/20; F01N 9/002; F01N 3/021; F01N 3/101; F01N 2900/08;
(Continued)

(56) References Cited

U.S. PATENT DOCUMENTS 8,438,840 B2 * 5/2013 Bidner .................. F02M 26/47 60/285
10,753,291 B1 * 8/2020 Choung ................ F02D 41/068
(Continued)

FOREIGN PATENT DOCUMENTS

KR 10-1619394 B1 5/2016

OTHER PUBLICATIONS

Kyohei Kato, et al. "Next Generation of Ceramic Wall Flow Gasoline Particulate Filter with Integrated Three Way Catalyst", SAE 2015-01-1073, Published Apr. 14, 2015.

*Primary Examiner* — Matthew T Largi
(74) *Attorney, Agent, or Firm* — MORGAN, LEWIS & BOCKIUS LLP

(57) ABSTRACT

An engine control system includes an engine, an intake valve, an ignition plug mounted in a combustion chamber, an exhaust valve; a dual continuously variable valve duration device configured to adjust an intake duration of the intake valve and an exhaust duration of the exhaust valve; a turbine mounted downstream of the engine; a warm-up catalyst (WCC) mounted downstream of the turbine; a gasoline particulate filter (GPF) mounted downstream of the warm-up catalyst; and a controller operably connected to the ignition plug and the dual continuously variable valve duration device and configured to adjust an ignition timing of the ignition plug, the intake duration, and the exhaust duration based on a driving condition of a vehicle, wherein under a condition that lambda (λ) is 1, the controller is configured to adjust the exhaust duration so that an exhaust valve open timing is retarded, and an intake valve close
(Continued)

(IVC) timing is maintained to maintain a valve overlap period.

18 Claims, 12 Drawing Sheets

(51) Int. Cl.
*F01N 9/00* (2006.01)
*F02D 13/02* (2006.01)

(58) Field of Classification Search
CPC ........ F01N 2900/10; F01N 3/023; F01N 3/10; F02D 13/0215; F02D 2200/021; F02D 2200/501; F02D 13/0207; F02D 37/02; F02D 41/029; F02D 13/0261; F02D 41/0002; F02D 2041/001; F02D 2200/023; F02P 5/1502
See application file for complete search history.

(56) References Cited

U.S. PATENT DOCUMENTS

| | | | | |
|---|---|---|---|---|
| 2011/0072788 | A1* | 3/2011 | Ruona | F02D 41/029<br>60/287 |
| 2017/0204761 | A1* | 7/2017 | Ulrey | F02D 41/123 |
| 2019/0032585 | A1* | 1/2019 | Kelly | F02D 41/029 |
| 2020/0011226 | A1* | 1/2020 | Kim | F01N 9/002 |
| 2020/0340413 | A1* | 10/2020 | Kim | F01N 3/023 |
| 2024/0254905 | A1* | 8/2024 | Moorcroft | F01N 3/101 |

* cited by examiner

FIG. 3

| | IVO | IVC | EVO | EVC | Valve overlap |
|---|---|---|---|---|---|
| Ignition timing retardation | -6 | 142 | -189 | 5 | 11 (Positive) |
| EVO retardation | ↑ | ↑ | -189 ~ -149 | ↑ | ↑ |

ENGINE CONTROL SYSTEM INCLUDING DUAL CONTINUOUS VARIABLE VALVE DURATION DEVICE AND GPF FORCED REGENERATION METHOD USING THE ENGINE CONTROL SYSTEM

CROSS-REFERENCE TO RELATED APPLICATION

The present application claims priority to Korean Patent Application No. 10-2023-0160994 filed on Nov. 20, 2023, the entire contents of which is incorporated herein for all purposes by this reference.

BACKGROUND OF THE PRESENT DISCLOSURE

Field of the Present Disclosure

The present disclosure relates to a GPF forced regeneration method using a dual continuously variable valve duration device, and more specifically, to a method of forcibly regenerating a gasoline filtration filter (GPF) and reducing emissions (EM) contained in an exhaust gas by raising a temperature of an exhaust gas and supplying a sufficient amount of oxygen, under positive valve overlap conditions, by adjusting an exhaust duration of an engine.

Description of Related Art

Generally, an internal combustion engine generates power by receiving fuel and air into a combustion chamber and combusting the fuel and air. When taking in the air, intake valves are actuated by drive of a camshaft, and the air is drawn into the combustion chamber while the intake valves are open. Furthermore, exhaust valves are actuated by drive of the camshaft, and an exhaust gas is discharged from the combustion chamber while the exhaust valves are open.

An optimal operation of the intake valves and the exhaust valves depends on a rotation speed of an engine. That is, a proper lift or a valve open/close timing depends on the rotation speed of the engine. To implement such a proper valve operation depending on the rotation speed of the engine, researches, such as designing of a plurality of shapes for a cam for driving a valve and a continuously variable valve lift (CVVL) apparatus that enables a valve to operate at a different lift according to an engine speed, have been undertaken.

Additionally, a continuously variable valve timing (CVVT) technology has been developed to control a valve open timing, which is a technology in which valve open/close timings are simultaneously changed while a valve duration is fixed.

Recently, a technology (continuously variable valve duration; CVVD) that adjusts a valve opening period (i.e., valve duration) based on driving conditions of a vehicle has been developed and has been applied to vehicles.

On the other hand, a technology in which a gasoline particulate filter (GPF) is mounted on a vehicle to physically capture particulate matters (PM) emitted from an engine has been applied to vehicles.

Combustion of soot deposited in the filter is closely related to an exhaust gas temperature. That is, the higher the exhaust gas temperature and the higher the oxygen concentration, the faster the combustion speed of the soot.

In the case of a GPF mounted for a gasoline engine, the soot emitted from the engine is more contained in the gasoline engine exhaust gas than in the diesel engine exhaust gas, so if the engine is operated under a temperature condition that the exhaust gas temperature is 600° C. or higher at which the soot may be combusted, a condition is formed in which the soot may be naturally combusted without separate post-injection. However, the high temperature of the exhaust gas should be maintained continuously, and if the temperature changes significantly, combustion of the soot is more difficult to occur.

On the other hand, because a gasoline engine is operated under stoichiometric conditions, the oxygen concentration in the exhaust gas is very small (generally, under the condition of air-fuel ratio A/F 14.7 (lambda 1), the oxygen concentration in the exhaust gas is 1% to 1.5%). Therefore, even if the exhaust gas temperature conditions are favorable, combustion of the soot deposited in the GPF occurs very slowly (combustion speed is very slow) because the oxygen concentration is very small.

Ultimately, when the vehicle is continuously driven at low speeds (for example, city driving and the like), the soot emitted from the engine may be continuously deposited inside the filter due to the low exhaust gas temperature and low oxygen concentration.

If the soot accumulated in the instant way includes an amount in excess of a limit of the filter and encounters a condition such as fuel cut at high speed under such a condition, the filter may be damaged due to rapid combustion of the soot.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a gasoline particulate filter (GPF) forced regeneration method using a dual continuously variable valve duration device for forcibly regenerating a GPF and reducing emissions contained in an exhaust gas by adjusting an exhaust duration of an engine using a dual continuously variable valve duration device to raise a temperature of the exhaust gas and increase an oxygen concentration.

An engine control system with a dual continuously variable valve duration device according to various exemplary embodiments of the present disclosure includes an engine including a combustion chamber, an intake valve provided in the combustion chamber to selectively supply air or a mixture of air and fuel to the combustion chamber, an ignition plug mounted in the combustion chamber to ignite and burn the mixture, and an exhaust valve provided in the combustion chamber to selectively discharge an exhaust gas in the combustion chamber to an outside of the combustion chamber; a dual continuously variable valve duration device configured to adjust an intake duration of the intake valve and an exhaust duration of the exhaust valve; a turbine mounted downstream of the engine and configured to pass therethrough the exhaust gas discharged from the engine and to discharge the exhaust gas with strong pressure by rotation thereof; a warm-up catalyst (WCC) mounted downstream of the turbine and mounted on an exhaust pipe connecting the engine and the turbine to preheat the exhaust gas; a gasoline particulate filter (GPF) mounted downstream of the warm-up catalyst and mounted on the exhaust pipe to filter out soot contained in the exhaust gas; and a controller operably connected to the ignition plug and the dual continuously variable valve duration device and configured to adjust an ignition timing of the ignition plug, the intake duration, and the exhaust duration based on a driving condition of a vehicle, wherein under a condition that lambda (λ) is 1, the controller is configured to adjust the exhaust duration and to perform control so that an exhaust valve open timing is retarded, and an intake valve close (IVC) timing is maintained to maintain a valve overlap period.

The retardation of the exhaust valve open (EVO) timing may be set to −189° to −149° based on a top dead center (TDC).

During a retardation period of the exhaust valve open timing, a temperature of the warm-up catalyst on the downstream side of the turbine may increase by 93° C.

During a retardation period of the exhaust valve open timing, a mass flow rate of oxygen (O2) may be 150 mg/s or more than 150 mg/s and 600 mg/s or less than 600 mg/s on an upstream side of the warm-up catalyst.

During a retardation period of the exhaust valve open timing, a mass flow rate of oxygen (O2) may be 280 mg/s or less than 280 mg/s on the downstream side of the warm-up catalyst.

Under the condition that lambda (λ) is 1, a mass flow rate of oxygen (O2) necessary for regeneration of the GPF may be 190 mg/s or more than 190 mg/s.

Under the condition that lambda (λ) is 1, a minimum temperature necessary for regeneration of the GPF may be 600° C.

During a retardation period of the exhaust valve open timing, a coefficient of variation (CoV) of an indicated mean effective pressure (IMEP) may be 2% or less than 2%.

During a retardation period of the exhaust valve open timing, a NOx concentration on the downstream side of the warm-up catalyst may increase from 80 ppm to 820 ppm.

During a retardation period of the exhaust valve open timing, a brake specific fuel consumption (BSFC) may increase from 245 g/kWh to 285 g/kWh.

A GPF forced regeneration method using an engine control system including a dual continuously variable valve duration device of the present disclosure includes starting a vehicle; determining, by a controller, whether an accumulated driving distance (ODO) exceeds a mileage setting value and whether an engine coolant temperature is less than a temperature setting value; in response that the controller concludes that the accumulated driving distance (ODO) exceeds the mileage setting value and the engine coolant temperature is less than the temperature setting value, determining, by the controller, a time necessary for forced regeneration of a GPF; determining, by the controller, whether a speed of the vehicle exceeds a speed setting value and whether a real-time torque model value exceeds a torque setting value; in response that the controller concludes that the speed of the vehicle exceeds the speed setting value and the real-time torque model value exceeds the torque setting value, performing, by the controller, EVO retardation control to forcibly regenerate the GPF; determining, by the controller, whether an accumulated forced regeneration time of the GPF exceeds a required forced regeneration time; and in response that the controller concludes that the accumulated forced regeneration time of the GPF exceeds the required forced regeneration time, terminating the forced regeneration and performing a normal operation by the controller.

The accumulated forced regeneration time of the GPF may be determined depending on an amount of oxygen supply in an exhaust gas supplied to the GPF and a temperature of the exhaust gas.

The amount of oxygen supply in the exhaust gas supplied to the GPF and the temperature of the exhaust gas may be determined by an engine revolutions per minute (rpm) and a torque of the engine.

The amount of oxygen supply in the exhaust gas supplied to the GPF and the temperature of the exhaust gas may vary depending on an exhaust valve open (EVO) timing.

According to various exemplary embodiments of the present disclosure, the temperature of the exhaust gas may be raised by adjusting the exhaust duration of the engine. In the instant case, a ternary catalyst located downstream of the engine is heated rapidly and can rapidly reach an activation temperature. Therefore, the amount of emissions may be reduced by shortening the warm-up time of the ternary catalyst.

Additionally, it is possible to forcibly regenerate the gasoline filtration filter (GPF) by raising the temperature of the exhaust gas and supplying a sufficient amount of oxygen, under positive valve overlap conditions, by adjusting an exhaust duration of an engine.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a table in which a valve timing, including exhaust valve open (EVO) timing retardation, of the engine control system according to the exemplary embodiment of the present disclosure is compared with ignition timing retardation.

Figure 1:
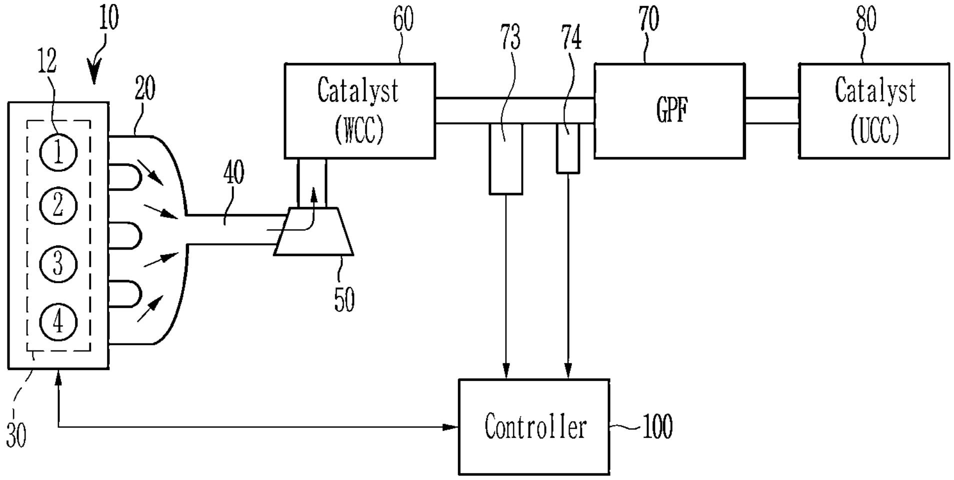
FIG. 1 is a configuration view of an engine control system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Terms used herein are only to describe specific exemplary embodiments of the present disclosure, and are not intended to limit the present disclosure. As used herein, the singular forms are intended to include the plural forms as well, unless the context clearly indicates otherwise. It will be further understood that the terms “comprise” and/or “comprising” when used herein specify the presence of stated features, integers, steps, operations, elements and/or components, but do not preclude the presence or addition of one or more other features, integers, steps, operations, components, and/or groups thereof. As used herein, the term “and/or” includes any one or all combinations of one or more of associated listed items. As used herein, the term “and/or” includes any one or all combinations of one or more of associated listed items.

The term “vehicle” or “vehicular”, “automobile” or other similar term as used herein refers to motor vehicles, in general, such as passenger vehicles including sports utility vehicles (SUV), buses, trucks, and various commercial vehicles, watercraft including a variety of boats and ships, and aircraft, and includes hybrid vehicles, electric vehicles, hybrid electric vehicles, hydrogen-powered vehicles and other alternative fuel vehicles (e.g., fuels derived from resources other than petroleum).

Additionally, one or more of methods or aspects thereof below may be executed by at least one or more controllers. The term “controller” may refer to a hardware device that includes a memory and a processor. The memory is configured to store program instructions and the processor is specially programmed to execute the program instructions that perform one or more processes described in more detail below. Furthermore, the methods below may be implemented by a system that includes a controller, as described in more detail below.

Furthermore, the controller of the present specification may be implemented as a non-transitory computer-readable medium including executable program instructions that are executed by the processor or the like. Examples of the computer-readable medium include, but are not limited to, a ROM, a RAM, a CD ROM, a magnetic tape, a floppy disk, a flash drive, a smart card, and an optical data storage device. The computer-readable medium may also be distributed over a computer network so that program instructions are stored in distributed form or executed, for example, by a telematics server or a Controller Area Network (CAN).

Hereinafter, various exemplary embodiments of the present disclosure will be described in detail with reference to the accompanying drawings.

Figure 2:
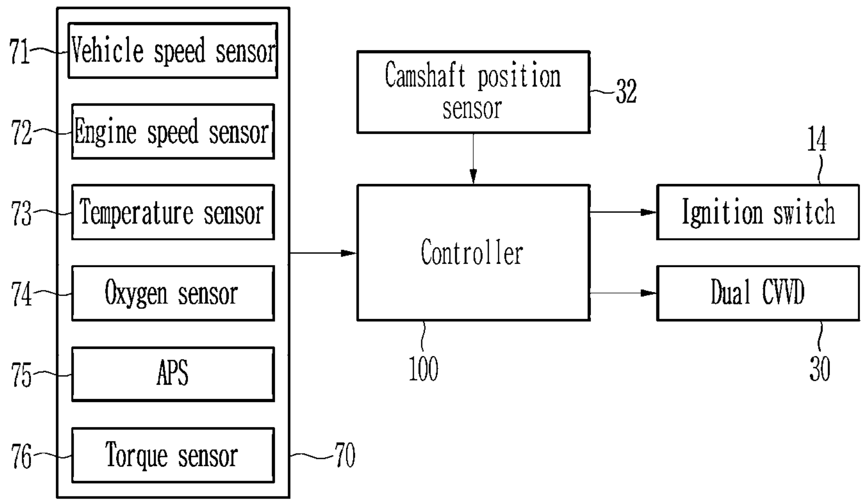
FIG. 2 is a block diagram of the engine control system according to the exemplary embodiment of the present disclosure.

FIG. 1 is a configuration view of an engine control system according to various exemplary embodiments of the present disclosure, and FIG. 2 is a block diagram of the engine control system according to the exemplary embodiment of the present disclosure.

As shown in FIG. 1, the engine control system according to various exemplary embodiments of the present disclosure includes an engine 10, a dual continuously variable valve duration (dual CVVD) device 30, a turbine 50, a warm-up catalyst (WCC) 60, a gasoline particulate filter (GPF) 70, and a controller 100.

The engine 10 converts chemical energy into mechanical energy by combusting a mixture of fuel and air. The engine 10 includes a plurality of combustion chambers 12. An intake valve, an ignition plug, an exhaust valve, an injector, and the like are provided in the combustion chamber 12, and the mixture combusted in the combustion chamber 12 is discharged through an exhaust manifold 20.

The combustion chamber 12 is connected to an intake manifold and receives air or a mixture of air and fuel. An intake port is formed in the combustion chamber 12, and the intake port is provided with the intake valve. The intake valve is actuated by rotation of a camshaft connected to a crankshaft to open or close the intake port. When the intake valve opens the intake port, the air or mixture in the intake manifold flows into the combustion chamber 12 through the intake port, and when the intake valve closes the intake port, the air or mixture in the intake manifold does not flow into the combustion chamber 12. Furthermore, the combustion chamber 12 is connected to the exhaust manifold 20, so that an exhaust gas generated during the combustion process collects in the exhaust manifold 20 and then flows into an exhaust pipe 40. An exhaust port is formed in the combustion chamber 12, and the exhaust port is provided with the exhaust valve. The exhaust valve is also actuated by rotation of the camshaft connected to the crankshaft to open or close the exhaust port. When the exhaust valve opens the exhaust port, the exhaust gas in the combustion chamber 12 flows into the exhaust manifold 20 through the exhaust port, and when the exhaust valve closes the exhaust port, the exhaust gas in the combustion chamber 12 does not flow into the exhaust manifold 20.

Depending on a type of engine, for example, in the case of a gasoline direct injection engine, an injector may be mounted in the combustion chamber 12 to inject fuel into the combustion chamber 12. Additionally, depending on a type of engine, for example, in the case of a gasoline engine, an ignition plug is provided on top of the combustion chamber 12 to ignite the mixture in the combustion chamber 12.

The dual CVVD device 30 is mounted on top of the engine 10 and adjusts a duration of the intake valve and a duration of the exhaust valve. The dual CVVD device 30 is configured by integrating an intake CVVD device that variably adjusts a valve duration of the intake valve and an exhaust CVVD device that variably adjusts a valve duration of the exhaust valve. As the dual CVVD device 30, various CVVD devices known to date may be used, such as a CVVD described in Korea Patent Registration No. 1619394, and the entire content included in Korea Patent Registration No. 1619394 is incorporated herein by reference. In addition to the CVVD included in Korea Patent Registration No. 1619394, various CVVDs known to date may be used, and it should be understood that the CVVD according to exemplary embodiments of the present disclosure is not limited to the CVVD included in Korea Patent Registration No. 1619394.

Here, the duration of the intake valve is referred to as 'intake duration'. The intake duration is defined as a period from a timing at which the intake valve opens to a timing at which the intake valve closes. Additionally, the timing at which the intake valve opens is referred to as an intake valve open (IVO) timing, and the timing at which the intake valve closes is referred to as an intake valve close (IVC) timing. Therefore, the intake duration is a period from the IVO timing to the IVC timing.

Additionally, here, the duration of the exhaust valve is referred to as 'exhaust duration'. The exhaust duration is defined as a period from a timing at which the exhaust valve opens to a timing at which the exhaust valve closes. Additionally, the timing at which the exhaust valve opens is referred to as an exhaust valve open (EVO) timing, and the timing at which the exhaust valve closes is referred to as an exhaust valve close (EVC) timing. Therefore, the exhaust duration is a period from the EVO timing to the EVC timing.

The exhaust pipe 40 is connected to the exhaust manifold 20 to discharge the exhaust gas to the outside of the vehicle. Various catalytic converters are mounted on the exhaust pipe 40 to remove emissions contained in the exhaust gas.

The turbine 50 passes therethrough the exhaust gas on a downstream side of the engine 10 and discharges the exhaust gas with strong pressure by rotation.

The warm-up catalyst 60 is mounted downstream of the turbine 50 and is provided on the exhaust pipe 40 to preheat the exhaust gas. The warm-up catalyst 40 is a catalyst for raising a temperature of the exhaust gas in a short time. Because the exhaust gas increases in temperature as it passes through the warm-up catalyst 40 and is then sent to a main catalyst means, a time for the main catalyst means to reach an appropriate temperature may be shortened. As a result, the main catalyst means is allowed to fully function even in an initial operation of the engine 10, so that the exhaust gas purification efficiency may be multiplied.

The gasoline particulate filter 70 is mounted downstream of the warm-up catalyst 60 and is provided on the exhaust pipe 40 to filter out soot contained in the exhaust gas. The exhaust gas discharged from the engine 10 passes through the warm-up catalyst 60 and then enters the gasoline particulate filter 70 through the exhaust pipe 40, and the gasoline particulate filter 70 filters the exhaust gas. Thereafter, the filtered exhaust gas is discharged through the exhaust pipe 40 connected downstream of the gasoline particulate filter 70. The gasoline particulate filter 70 may be connected to the controller to control an actuation of the engine control system.

The vehicle and the exhaust pipe 40 are mounted with a plurality of sensors 71, 72, 73, 74, 75, 76, and 32 for detecting a vehicle and a combustion state.

The temperature sensor 73 is mounted on the exhaust pipe 40 on a downstream side of the turbine 50 and the warm-up catalyst 60 and an upstream side of the gasoline particulate filter 70, detects a temperature of the exhaust gas on a downstream side of the turbine 50 and the warm-up catalyst 60 and transmits a signal corresponding thereto to the controller 100.

The oxygen sensor 74 is mounted on the exhaust pipe 40 on the downstream side of the turbine 50 and the warm-up catalyst 60 and the upstream side of the gasoline particulate filter 70, detects a concentration of oxygen contained in the exhaust gas on the downstream side of the turbine 50 and the warm-up catalyst 60 and transmits a signal corresponding thereto to the controller 100.

As shown in FIG. 2, the engine control system may further include a vehicle speed sensor 71, an engine speed sensor 72, an accelerator position sensor (APS) 75, a torque sensor 76, a camshaft position sensor 32, and the like.

The vehicle speed sensor 71 detects a speed of the vehicle and transmits a signal corresponding thereto to the controller 100, and may be mounted on a wheel of the vehicle, or the like.

The engine speed sensor 72 detects a rotation speed of the engine 10 according to a phase change of the crankshaft or a phase change of the camshaft and transmits a signal corresponding thereto to the controller 100.

The accelerator position sensor (APS) 75 detects a degree to which a driver presses an accelerator pedal. When the accelerator pedal is fully pressed, a position value of the accelerator pedal may be 100%, and when the accelerator pedal is not pressed, the position value of the accelerator pedal may be 0%. For the accelerator position sensor 75, a throttle position sensor (TPS) mounted on an intake passage may also be used, instead of the APS.

The torque sensor 76 measures a torque of, for example, the crankshaft or the like and transmits a signal corresponding thereto to the controller 100.

The camshaft position sensor 32 detects an angle change of the camshaft and transmits a signal corresponding thereto to the controller 100.

The controller 100 can adjust operations of the turbine 50 and the dual CVVD device 30 in accordance with the output signals of the various sensors, adjusting the opening and closing and durations of the intake and exhaust valves.

Under a condition that lambda ($\lambda$) is 1, the controller 100 may adjust the exhaust duration and perform control so that the exhaust valve open (EVO) timing is retarded, and the intake valve close (IVC) timing is maintained to maintain a valve overlap period.

Figure 4:
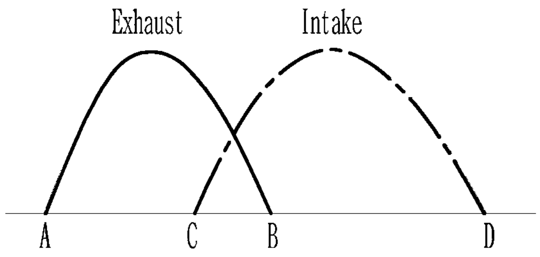
FIG. 4 shows an exhaust valve timing, including the EVO timing retardation, of the engine control system according to the exemplary embodiment of the present disclosure together with an intake valve timing.

FIG. 3 is a table in which a valve timing, including exhaust valve open (EVO) timing retardation, of the engine control system according to the exemplary embodiment of the present disclosure is compared with ignition timing retardation, and FIG. 4 shows an exhaust valve timing, including the EVO timing retardation, of the engine control system according to the exemplary embodiment of the present disclosure together with an intake valve timing.

Referring to FIG. 3, the ignition timing retardation strategy of the related art is to set the IVO timing to −6°, the IVC timing to +142°, the EVO timing to −189°, and the Exhaust Valve Close (EVC) timing to +5°, based on a top dead center (TDC). In the instant case, the exhaust valve open (EVO) timing and the intake valve open (IVO) timing overlap by 11° at a point between −6° and +5° based on the top dead center (valve overlap).

On the other hand, the EVO retardation strategy according to various exemplary embodiments of the present disclosure is to set the IVO timing, the IVC timing, and the EVC timing to −6°, +142°, and +5°, respectively, as in the ignition timing retardation strategy of the related art, and to retard only the EVO timing from −189° to −149°.

In the instant case, as shown in FIG. 4, the EVC timing (B) and IVO timing (C) are the same as in the ignition timing retardation strategy of the related art, so that the overlap of 11° (an interval from a point C to a point B) is maintained and the intake duration (an interval from the point C to a point D) is also maintained, but the exhaust duration (an interval from a point A to the point B) is reduced as much as the EVO timing (A) is retarded.

In the above case, a back pressure in the combustion chamber 12 of the engine 10 is increased as much as the EVO timing is retarded, and the pressure in the intake manifold increases due to the increase in back pressure in the combustion chamber 12. Furthermore, a difference between the pressure of the intake manifold and the exhaust pressure during the valve overlap period increases, and amounts of CO and O2 in the exhaust gas increase.

CO and O2 in the exhaust gas react in the warm-up catalyst 60, and the present reaction increases the exhaust gas temperature on the upstream side of the GPF 70. Residual O2 remaining in the GPF 70 after oxidation of CO and THC (total hydrocarbon) is consumed in a separate UCC (underfloor catalytic converter) catalyst 80 located on the exhaust pipe 40 on a downstream side of the GPF 70, and NOx may be purified.

Figure 5:
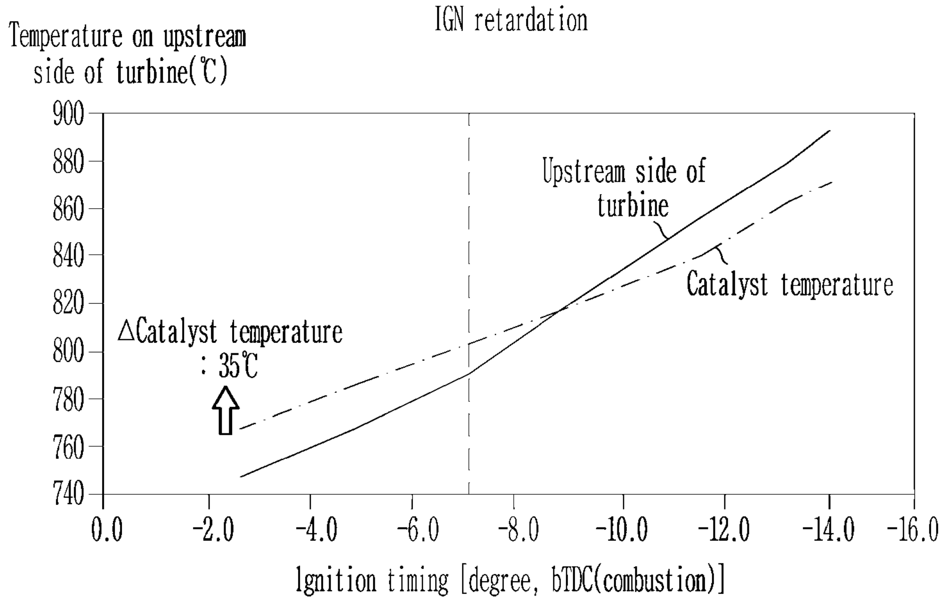
FIG. 5 is a graph showing changes in temperature on an upstream side of a turbine and temperature of a catalyst when ignition timing retardation of the related art is applied.
Figure 6:
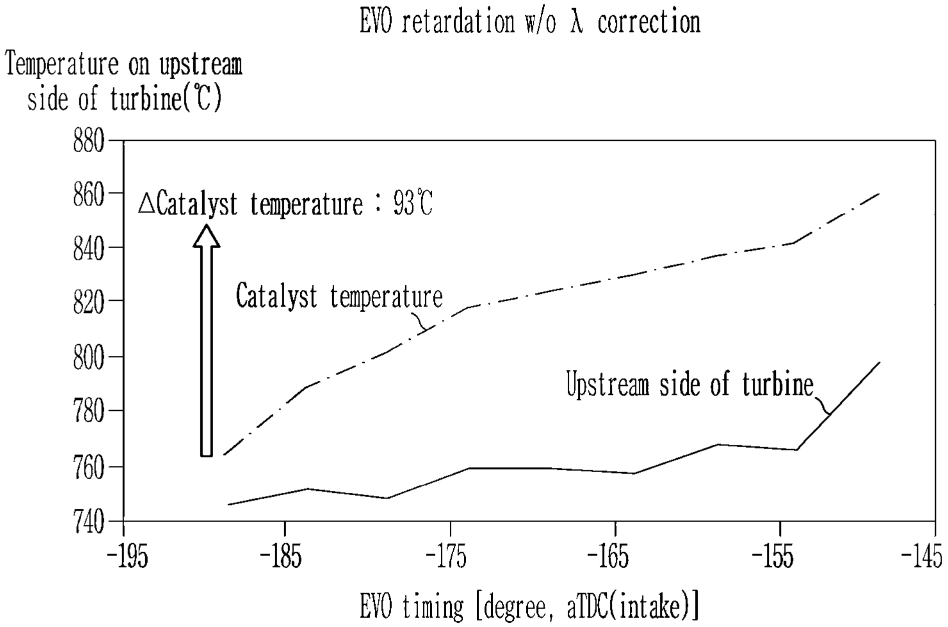
FIG. 6 is a graph showing changes in temperature on an upstream side of a turbine and temperature of a catalyst when the EVO timing retardation of the engine control system according to the exemplary embodiment of the present disclosure is applied.

FIG. 5 is a graph showing changes in temperature on an upstream side of a turbine and temperature of a catalyst when ignition timing retardation of the related art is applied, and FIG. 6 is a graph showing changes in temperature on an upstream side of a turbine and temperature of a catalyst when the EVO timing retardation of the engine control system according to the exemplary embodiment of the present disclosure is applied.

Referring to FIG. 5, when the ignition timing retardation is applied, the ignition timing is retarded by about −3.0° to about −14.0°, and the temperature of the warm-up catalyst 60 increases by about 35° C., excluding a region of about −7.0° or higher, which is an inapplicable region due to combustion instability.

On the other hand, referring to FIG. 6, when the EVO timing retardation is applied, the EVO timing is retarded by −189° to −149° based on the top dead center (TDC), and the temperature of the warm-up catalyst 60 increases by about 93° C.

Note that, during the retardation period of the exhaust valve open timing, a coefficient of variation (CoV) of an indicated mean effective pressure (IMEP) on the downstream side of the turbine 50 may be set to about 2% or less than 2%.

It may be seen that, compared to the ignition timing retardation strategy, which is the temperature-raising strategy of the related art, when the EVO retardation strategy is applied, the temperature of the warm-up catalyst 60 may be raised to a greater extent under a stable combustion condition.

Figure 7:
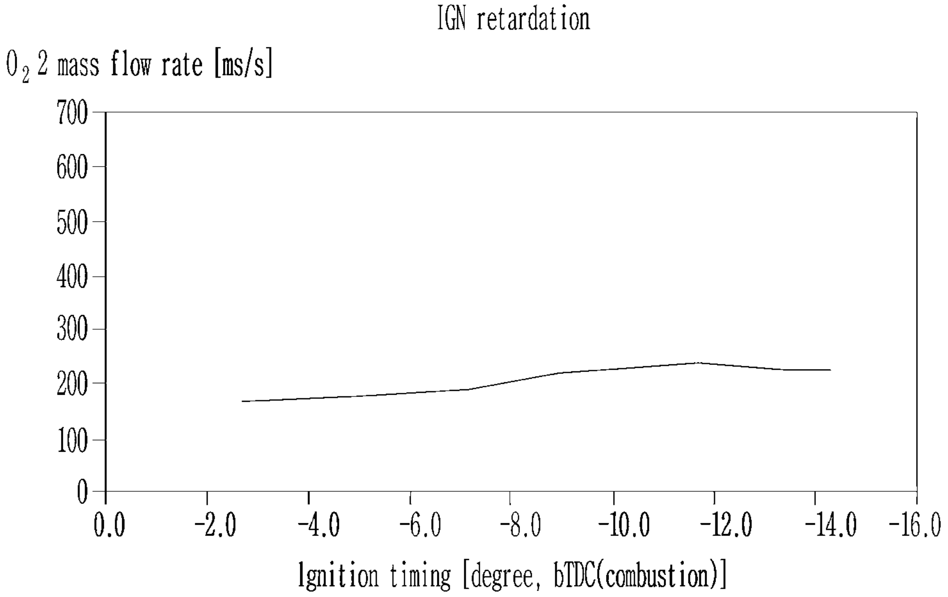
FIG. 7 is a graph showing a change in oxygen flow rate on an upstream side of a catalyst when the ignition timing retardation of the related art is applied.
Figure 8:
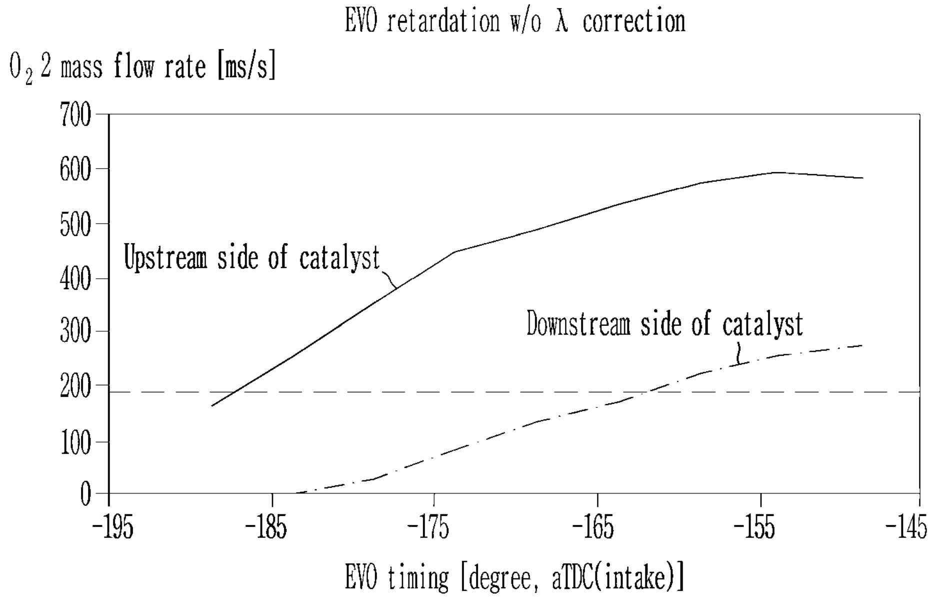
FIG. 8 is a graph showing changes in oxygen flow rate on upstream and downstream sides of a catalyst when the EVO timing retardation of the engine control system according to the exemplary embodiment of the present disclosure is applied.
Figure 9:
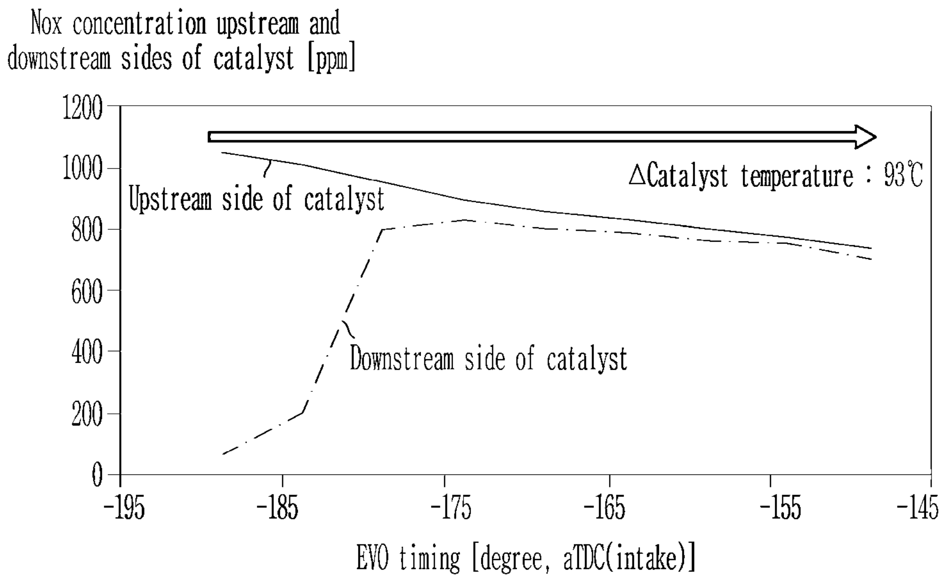
FIG. 9 is a graph showing a change in concentration of nitrogen oxide (NOx) on outstream and downstream sides of a catalyst when the EVO timing retardation of the engine control system according to the exemplary embodiment of the present disclosure is applied.

FIG. 7 is a graph showing a change in oxygen flow rate on an upstream side of a catalyst when the ignition timing retardation of the related art is applied, FIG. 8 is a graph showing changes in oxygen flow rate on upstream and downstream sides of a catalyst when the EVO timing retardation of the engine control system according to the exemplary embodiment of the present disclosure is applied, and FIG. 9 is a graph showing a change in concentration of nitrogen oxide (NOx) on outstream and downstream sides of a catalyst when the EVO timing retardation of the engine control system according to the exemplary embodiment of the present disclosure is applied.

Referring to FIG. 7, when the ignition timing retardation is applied, the oxygen flow rate on the upstream side of the warm-up catalyst 60 is maintained at a flow rate around 200 mg/s, and converges to about 0 on the downstream side of the warm-up catalyst 60 because there is no change in the exhaust composition.

Referring to FIG. 8, it may be seen that, when the EVO timing retardation is applied, during the retardation period of the EVO timing, the mass flow rate of O2 increases from about 150 mg/s to about 600 mg/s on the upstream side of the warm-up catalyst 60 and increases to about 280 mg/s on the downstream side of the warm-up catalyst 60. Under the condition that lambda (λ) is 1, the mass flow rate of O2 necessary for regeneration of the GPF 70 is about 190 mg/s or more than 190 mg/s, and on the downstream side of the warm-up catalyst 60, the mass flow rate of O2 may be sufficiently secured during almost the entire retardation period of the EVO timing.

Compared to the ignition timing retardation strategy of the related art, when the EVO timing retardation strategy of the present disclosure is applied, the high mass flow rate of O2 may be secured on the downstream side of the warm-up catalyst 60, that is, on the upstream side of the GPF 70. However, as shown in FIG. 9, the NOx concentration on the downstream side of the warm-up catalyst 60 increases from about 80 ppm to about 820 ppm during the retardation period of the EVO timing. That is, the increase in the mass flow rate of O2 on the downstream side of the warm-up catalyst 60 and the upstream side of the GPF 70 causes a disadvantage in that the NOx purification efficiency of the warm-up catalyst 60 is reduced. However, since O2 is consumed through forced regeneration of the GPF 70, reduction of NOx is possible in the UCC catalyst 80.

Figure 10:
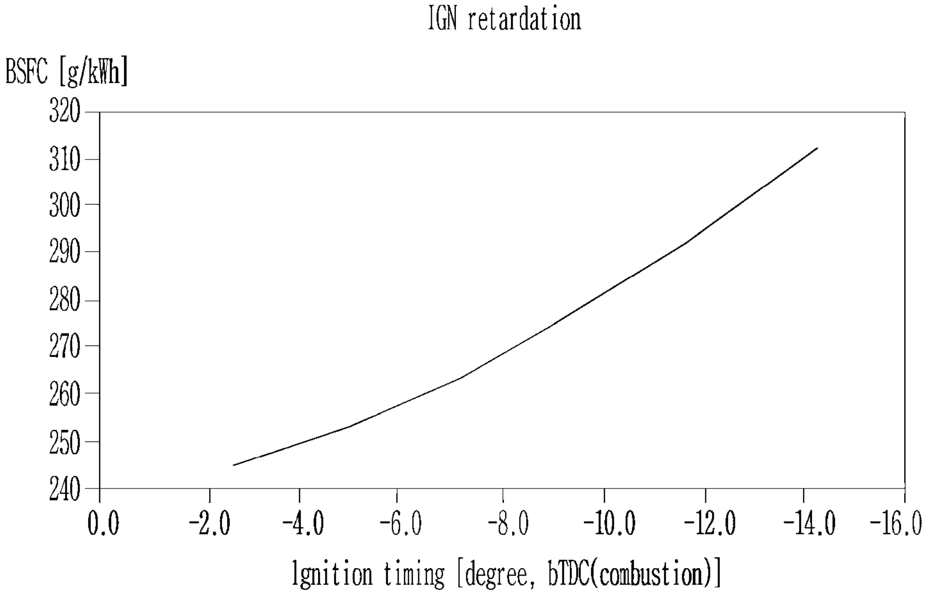
FIG. 10 is a graph showing a change in brake specific fuel consumption (BSFC) when the ignition timing retardation of the related art is applied.
Figure 11:
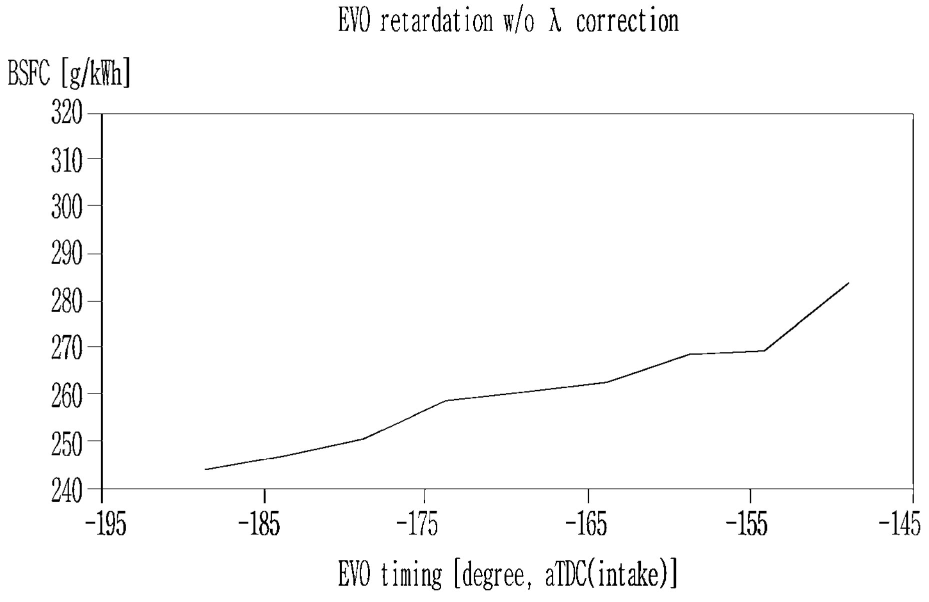
FIG. 11 is a graph showing a change in BSFC when the EVO timing retardation of the engine control system according to the exemplary embodiment of the present disclosure is applied.

FIG. 10 is a graph showing a change in brake specific fuel consumption (BSFC) when the ignition timing retardation of the related art is applied, and FIG. 11 is a graph showing a change in BSFC when the EVO timing retardation of the engine control system according to the exemplary embodiment of the present disclosure is applied.

Referring to FIG. 10, when the ignition timing retardation of the related art is applied, the brake specific fuel consumption (BSFC) increases from about 245 g/kWh to about 310 g/kWh. However, as shown in FIG. 11, when the EVO timing retardation of the engine control system according to various exemplary embodiments of the present disclosure is applied, the BSFC only increases from about 245 g/kWh to about 285 g/kWh. Therefore, under the condition that lambda (λ) is 1, the GPF 70 may be periodically regenerated when the load is above a certain level even if a fuel cut condition does not occur. Furthermore, while maintaining torque and ensuring combustion stability, the temperature of the exhaust gas may be raised and O2 may be supplied.

Figure 12:
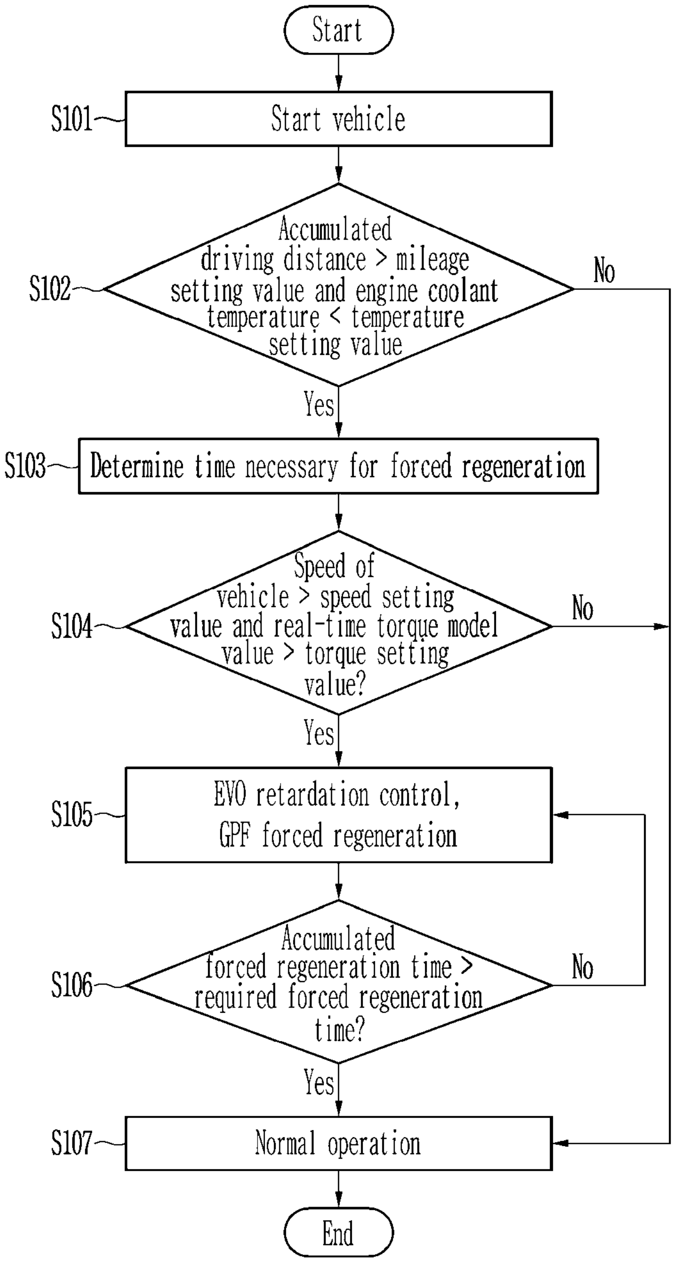
FIG. 12 is a flowchart showing a GPF forced regeneration method using an engine control system according to various exemplary embodiments of the present disclosure.

FIG. 12 is a flowchart showing a method of GPF forced regeneration using an engine control system according to various exemplary embodiments of the present disclosure.

Referring to FIG. 12, in a GPF forced regeneration method using an engine control system according to various exemplary embodiments of the present disclosure, the vehicle is first started and driven (S101). Then, the controller is configured to determine whether an accumulated driving distance (ODO) of the vehicle exceeds a mileage setting value and whether the engine coolant temperature is less than a temperature setting value (S102).

If it is determined that the accumulated driving distance (ODO) exceeds the mileage setting value and the engine coolant temperature is less than the temperature setting value, the controller is configured to determine a time necessary for forced regeneration of the GPF (S103).

Accordingly, the controller is configured to determine whether a speed of the vehicle exceeds a speed setting value and whether a real-time torque model value exceeds a torque setting value (S104).

If it is determined that the speed of the vehicle exceeds the speed setting value and the real-time torque model value exceeds the torque setting value, the controller is configured to perform EVO retardation control to forcibly regenerate the GPF (S105).

Thereafter, the controller is configured to determine whether an accumulated forced regeneration time of the GPF exceeds a required forced regeneration time (S106).

If it is determined that the accumulated forced regeneration time of the GPF exceeds the required forced regeneration time, the controller is configured to terminate the forced regeneration and is configured to perform a normal operation (S107).

The controller 100 is electrically connected to the sensors 71, 72, 73, 74, 75, 76, and 32, receives signals corresponding to values detected by the sensors 71, 72, 73, 74, 75, 76, and 32, and is configured to determine vehicle driving conditions such as vehicle driving conditions such as an accumulated driving distance (ODO), an engine coolant temperature, a vehicle speed, a torque model value, and an accumulated forced regeneration time of a GPF, based on the signals. The controller 100 may be configured for controlling at least one of the ignition timing of the ignition plug 14, the intake duration, and the exhaust duration, based on the above determination. The controller 100 may be implemented with one or more processors that operate according to a set program, and the set program may be one programmed to perform each step of the engine control method according to various exemplary embodiments of the present disclosure.

The accumulated forced regeneration time of the GPF may be determined depending on the amount of oxygen supply in the exhaust gas supplied to the GPF and the exhaust gas temperature. Additionally, the amount of oxygen supply in the exhaust gas supplied to the GPF and the exhaust gas temperature may be determined by an engine revolutions per minute (rpm) and a torque of the engine. Additionally, the amount of oxygen supply in the exhaust gas supplied to the GPF and the exhaust gas temperature may vary depending on the exhaust valve open (EVO) timing.

In the present way, according to various exemplary embodiments of the present disclosure, the temperature of the exhaust gas may be raised by adjusting the exhaust duration of the engine. In the instant case, a ternary catalyst located downstream of the engine is heated rapidly and can rapidly reach an activation temperature. Therefore, the amount of emissions may be reduced by reducing the warm-up time of the ternary catalyst.

Additionally, it is possible to forcibly regenerate the gasoline filtration filter (GPF) by raising the temperature of the exhaust gas and supplying a sufficient amount of oxygen, under positive valve overlap conditions, by adjusting an exhaust duration of an engine.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An engine control system with a dual continuously variable valve duration device, the engine control system comprising:
- an engine including,
  - a combustion chamber,
  - an intake valve provided in the combustion chamber to selectively supply air or a mixture of air and fuel to the combustion chamber,
  - an ignition plug mounted in the combustion chamber to ignite and burn the mixture, and
  - an exhaust valve provided in the combustion chamber to selectively discharge an exhaust gas in the combustion chamber to an outside of the combustion chamber;
- the dual continuously variable valve duration device configured to adjust an intake duration of the intake valve and an exhaust duration of the exhaust valve;
- a turbine mounted downstream of the engine and configured to pass therethrough the exhaust gas discharged from the engine and to discharge the exhaust gas with pressure by rotation thereof;
- a warm-up catalyst (WCC) mounted downstream of the turbine and mounted on an exhaust pipe connecting the engine and the turbine to preheat the exhaust gas;
- a gasoline particulate filter (GPF) mounted downstream of the warm-up catalyst on the exhaust pipe to filter out soot contained in the exhaust gas; and
- a controller operably connected to the ignition plug and the dual continuously variable valve duration device and configured to adjust an ignition timing of the ignition plug, the intake duration, and the exhaust duration based on a driving condition of a vehicle,
- wherein under a condition that lambda (λ) is 1, the controller is configured to adjust the exhaust duration and to perform control so that an exhaust valve open (EVO) timing is retarded, and an intake valve close (IVC) timing is maintained to maintain a valve overlap period, and
- wherein the retardation of the EVO timing is set to −189° to −149° based on a top dead center (TDC.

2. The engine control system of claim 1, wherein during a retardation period of the EVO timing, a temperature of the warm-up catalyst on the downstream side of the turbine increases by 93° C.

3. The engine control system of claim 1, wherein during a retardation period of the EVO timing, a mass flow rate of oxygen (O2) is 150 mg/s or more than 150 mg/s and 600 mg/s or less than 600 mg/s on an upstream side of the warm-up catalyst.

4. The engine control system of claim 1, wherein during a retardation period of the EVO timing, a mass flow rate of oxygen (O2) is 280 mg/s or less than 280 mg/s on the downstream side of the warm-up catalyst.

5. The engine control system of claim 1, wherein, under the condition that lambda (λ) is 1, a mass flow rate of oxygen (O2) necessary for regeneration of the GPF is 190 mg/s or more than 190 mg/s.

6. The engine control system of claim 1, wherein, under the condition that lambda (λ) is 1, a minimum temperature necessary for regeneration of the GPF is 600° C.

7. The engine control system of claim 1, wherein during a retardation period of the EVO timing, a coefficient of variation (CoV) of an indicated mean effective pressure (IMEP) is 2% or less than 2%.

8. The engine control system of claim 1, wherein during a retardation period of the EVO timing, a NOx concentration on the downstream side of the warm-up catalyst increases from 80 ppm to 820 ppm.

9. The engine control system of claim 1, wherein during a retardation period of the EVO timing, a brake specific fuel consumption (BSFC) increases from 245 g/kWh to 285 g/kWh.

10. The engine control system of claim 1, wherein the controller is further configured:

to determine whether an accumulated driving distance (ODO) exceeds a mileage setting value and whether an engine coolant temperature is less than a temperature setting value;

in response that the accumulated driving distance (ODO) exceeds the mileage setting value and the engine coolant temperature is less than the temperature setting value, to determine a time necessary for forced regeneration of the GPF;

to determine whether a speed of the vehicle exceeds a speed setting value and whether a real-time torque model value exceeds a torque setting value;

in response that the speed of the vehicle exceeds the speed setting value and the real-time torque model value exceeds the torque setting value, to perform control so that the exhaust valve open (EVO) timing is retarded to forcibly regenerate the GPF.

11. The engine control system of claim 10, wherein the controller is further configured:

to determine whether an accumulated forced regeneration time of the GPF exceeds a required forced regeneration time; and in response that the accumulated forced regeneration time of the GPF exceeds the required forced regeneration time, to terminate the forced regeneration and to perform a normal operation of the engine.

12. The engine control system of claim 11, wherein the accumulated forced regeneration time of the GPF is determined depending on an amount of oxygen supply in the exhaust gas supplied to the GPF and a temperature of the exhaust gas.

13. The engine control system of claim 12, wherein the amount of oxygen supply in the exhaust gas supplied to the GPF and the temperature of the exhaust gas are determined by an engine revolutions per minute (rpm) and a torque of the engine.

14. The engine control system of claim 13, wherein the amount of oxygen supply in the exhaust gas supplied to the GPF and the temperature of the exhaust gas vary depending on the exhaust valve opening (EVO) timing.

15. A gasoline particulate filter (GPF) forced regeneration method using an engine control system comprising a dual continuously variable valve duration device for an engine, the GPF forced regeneration method comprising:

starting a vehicle;

determining, by a controller operably connected to the dual continuously variable valve duration device, whether an accumulated driving distance (ODO) exceeds a mileage setting value and whether an engine coolant temperature is less than a temperature setting value;

in response that the accumulated driving distance (ODO) exceeds the mileage setting value and the engine coolant temperature is less than the temperature setting value, determining, by the controller, a time necessary for forced regeneration of a GPF;

determining, by the controller, whether a speed of the vehicle exceeds a speed setting value and whether a real-time torque model value exceeds a torque setting value;

in response that the speed of the vehicle exceeds the speed setting value and the real-time torque model value exceeds the torque setting value, performing, by the controller, EVO retardation control to forcibly regenerate the GPF;

determining, by the controller, whether an accumulated forced regeneration time of the GPF exceeds a required forced regeneration time; and in response that the accumulated forced regeneration time of the GPF exceeds the required forced regeneration time, terminating, by the controller, the forced regeneration and performing, by the controller, a normal operation of the engine.

16. The GPF forced regeneration method of claim 15, wherein the accumulated forced regeneration time of the GPF is determined depending on an amount of oxygen supply in an exhaust gas supplied to the GPF and a temperature of the exhaust gas.

17. The GPF forced regeneration method of claim 16, wherein the amount of oxygen supply in the exhaust gas supplied to the GPF and the temperature of the exhaust gas are determined by an engine revolutions per minute (rpm) and a torque of the engine.

18. The GPF forced regeneration method of claim 17, wherein the amount of oxygen supply in the exhaust gas supplied to the GPF and the temperature of the exhaust gas vary depending on an exhaust valve opening (EVO) timing.

* * * * *